United States Patent
Upadhye et al.

(10) Patent No.: US 11,669,834 B2
(45) Date of Patent: Jun. 6, 2023

(54) CONTACTLESS PAYMENT TECHNOLOGY WITH PAYMENT CARD NETWORK TO OPEN BANKING NETWORK CONVERSION

(71) Applicant: MASTERCARD INTERNATIONAL INCORPORATED, Purchase, NY (US)

(72) Inventors: Nilesh Tulsidas Upadhye, Chelmsford (GB); Joseph D. Hayes, Montclair, NJ (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 130 days.

(21) Appl. No.: 17/189,931

(22) Filed: Mar. 2, 2021

(65) Prior Publication Data

US 2022/0284421 A1 Sep. 8, 2022

(51) Int. Cl.
*G06Q 20/38* (2012.01)
*G06Q 20/34* (2012.01)
(Continued)

(52) U.S. Cl.
CPC .......... *G06Q 20/385* (2013.01); *G06F 9/547* (2013.01); *G06Q 20/108* (2013.01);
(Continued)

(58) Field of Classification Search
CPC .............. G06Q 20/385; G06Q 20/108; G06Q 20/352; G06Q 20/407; G06Q 40/02
(Continued)

(56) References Cited

U.S. PATENT DOCUMENTS

| | | |
|---|---|---|
| 10,878,422 B2 | 12/2020 | Sheets |
| 2010/0327054 A1* | 12/2010 | Hammad .......... G06Q 20/3255 235/375 |

(Continued)

FOREIGN PATENT DOCUMENTS

KR  1020200112089 A  10/2020

OTHER PUBLICATIONS

International Search Report and Written Opinion issued in International Application: PCT/US2022/015747, dated May 31, 2022, 10 pages.

*Primary Examiner* — Lindsay M Maguire
(74) *Attorney, Agent, or Firm* — Talem IP Law, LLP (57) ABSTRACT

Through the described contactless payment technology with payment card network to open banking network conversion, the open banking network can be leveraged to bring acceptance for digitized bank account based contactless payments. A converter can receive, via a payment card API channel, a contactless payment message, which includes at least a consumer account number, an acquirer account number, and transaction information for a transaction. The converter can convert the contactless payment message to an open banking message by obtaining a unique B2B trust token corresponding to the consumer account number and creating the open banking message for an open banking API channel using at least the B2B trust token, the acquirer account number, and the transaction information. The converter can communicate, via the open banking API channel, the open banking message to a consumer bank system.

20 Claims, 8 Drawing Sheets

(51) Int. Cl.
*G06Q 40/02* (2023.01)
*G06Q 20/10* (2012.01)
*G06Q 20/40* (2012.01)
*G06Q 20/32* (2012.01)
*G06Q 20/20* (2012.01)
*G06F 9/54* (2006.01)

(52) U.S. Cl.
CPC ......... *G06Q 20/352* (2013.01); *G06Q 20/407* (2013.01); *G06Q 40/02* (2013.01); *G06Q 20/202* (2013.01); *G06Q 20/204* (2013.01); *G06Q 20/3278* (2013.01)

(58) Field of Classification Search
USPC .......................................................... 705/42
See application file for complete search history.

(56) References Cited

U.S. PATENT DOCUMENTS

| | | |
|---|---|---|
| 2011/0313901 A1 | 12/2011 | Kletzer |
| 2012/0203700 A1 | 8/2012 | Ornce et al. |
| 2014/0089113 A1* | 3/2014 | Desai ................. G06Q 20/3278 705/16 |
| 2015/0032627 A1* | 1/2015 | Dill ........................... H04L 9/32 705/44 |
| 2016/0253652 A1* | 9/2016 | Je ........................... G06Q 20/02 705/39 |
| 2019/0197548 A1 | 6/2019 | Kelly-Frank et al. |

\* cited by examiner

CONTACTLESS PAYMENT TECHNOLOGY WITH PAYMENT CARD NETWORK TO OPEN BANKING NETWORK CONVERSION

BACKGROUND

Open banking refers to the systems and services enabling third parties to access financial information from financial institutions, such as banks, to generate and provide applications and services. Financial institutions participate in open banking through making available their application programming interfaces (APIs) to these third parties, consumers, and other financial institutions. Through these APIs, which provide access and control of consumer banking, transaction, and other financial data, open banking allows the networking of accounts and data across institutions.

Financial institutions have invested heavily in open banking APIs under regulatory direction to allow for innovative and competitive solutions. However, open banking currently only supports E-commerce payments. It may be desirable to enable financial institutions to also support new payment channels, such as contactless payments.

BRIEF SUMMARY

Contactless payment technology with payment card network to open banking network conversion is described herein. Through the described technology, the open banking network can be leveraged to bring scale and acceptance for digitized bank account based contactless payments. The conventional open banking API channel does not hold the semantics to manage the point of sale (POS) contactless transaction lifecycle. Indeed, the conventional open banking API channel does not support end-to-end settlement and end-to-end transaction management. The APIs that support end-to-end settlement and end-to-end transaction management are typically only available on the payment card API channel. Advantageously, though the described technology, these APIs are made available on the open banking API channel.

A payment card network-to-open banking network converter ("converter") can receive, via a payment card API channel, a contactless payment message. The contactless payment message can include at least a consumer account number, an acquirer account number, and transaction information for a transaction. The converter can convert the contactless payment message to an open banking message. The contactless payment message can be converted to an open banking message by obtaining a business-to-business (B2B) trust token corresponding to the consumer account number and creating the open banking message for an open banking API channel using at least the B2B trust token, the acquirer account number, and the transaction information. The B2B trust token is unique for the transaction. The converter can communicate, via the open banking API channel, the open banking message to a consumer bank system.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Contactless payment technology with payment card network to open banking network conversion is described herein. Through the described technology, the open banking network can be leveraged to bring scale and acceptance for digitized bank account based contactless payments. The conventional open banking API channel does not hold the semantics to manage the POS contactless transaction lifecycle. Indeed, the conventional open banking API channel does not support end-to-end settlement and end-to-end transaction management. The APIs that support end-to-end settlement and end-to-end transaction management are typically only available on the payment card API channel. Advantageously, though the described technology, these APIs are made available on the open banking API channel.

As previously explained, open banking provides access and control of consumer banking, transaction, and other financial data from financial institutions through open banking APIs.

Open banking may often require Strong Customer Authentication (SCA). SCA is a new European regulatory requirement to reduce fraud and make online payments more secure. SCA is required when the payer initiates an electronic payment transaction. SCA refers to authentication through at least two out of the following three factors: something only the user knows (e.g., passcode or PIN); something only the user possesses (e.g., mobile phone or token); and something the user is (e.g., fingerprint, facial, iris or eye vein). The selected factors must be mutually independent so that a breach of one does not compromise the reliability of the other.

For remote transactions, each SCA must be linked to a specific amount and payee (dynamic linking). This requirement aims at ensuring that a valid authentication code is only used once and for the specific transaction for which the authentication is requested.

In cases where SCA is required, the device needs to be online when authenticating a consumer. However, there are currently no open banking solutions that meet the SCA requirement for other payment channels where a consumer mobile device is offline. For example, many contactless payment products operate with devices that are offline.

Therefore, conventional open banking solutions do not support contactless payments.

Advantageously, through the described technology, including the payment card network-to-open banking network converter ("converter"), the open banking channel can be leveraged to bring scale and acceptance for digitized bank account based contactless payments.

As described herein a converter can receive, via a payment card API channel, a contactless payment message. The contactless payment message can include at least a consumer account number, an acquirer account number, and transaction information for a transaction. The converter can convert the contactless payment message to an open banking message. The contactless payment message can be converted to an open banking message by obtaining a B2B trust token corresponding to the consumer account number and creating the open banking message for an open banking API channel using at least the B2B trust token, the acquirer account number, and the transaction information. The B2B trust token is unique for the transaction. The converter can communicate, via the open banking API channel, the open banking message to a consumer bank system.

As illustrated above, the described converter uses a bilateral trust token model and specialized APIs to enable overall account based contactless payments. With the bilateral trust token model, an EMV single use token can be used from the Merchant POS terminal to a processing and conversion platform. Then, a B2B token can be used from the processing and conversion platform to the bank. Each token (e.g., the EMV single use token and the B2B token) is unique for every transaction.

Through the described converter, a financial institution's open banking APIs can be used for account-based contactless payments. Thus, the financial institution does not need to build an account-based contactless payment specification. Instead, the financial institution can simply allow fund movement API access.

Definitions

"Contactless payments" allow for a user to purchase products or services with a computing device (e.g., a chip embedded on a payment card or a mobile device with a wallet application) using, for example, RFID technology or near-field communication (NFC). Contactless payments work by holding a payment card or digital wallet within the vicinity of a contactless-enabled point-of-sale (POS) terminal. Thus, contactless payments do not require any physical contact between the user's device or payment card and the POS terminal.

"E-commerce payments" allow for the payment of goods and services through electronic systems, such as the Internet. E-commerce payments can be made, for example, through an e-commerce website or electronic environment without any need to use cash or check.

"In-app payments" allow for the purchase of goods and services from inside an application on a mobile device.

Contactless payments, in-application payments, and e-commerce payments are examples of person-to-merchant payment solutions. Person-to-merchant payment solutions utilize a payment ecosystem that facilitates mobile and digital payments based on the use of token PANS.

That is, for person-to-merchant payments, accounts, such as a bank account or payment card account, are digitized using a digitization platform. The process of digitization can include tokenization. Tokenization is the process of replacing a primary account number (PAN) with a unique alternate card number, or "token." These token PANs can be used for contactless payments, in-app payments, or e-commerce and do not expose any actual account details. Conventionally, tokens operate behind the scenes, thus, users do not know any details about their token PAN numbers. The generation and use of these tokens enable simpler, more secure digital payment experiences.

An "account" refers to an account, such as, but not limited to, a bank account or a payment card account, held directly or indirectly by a financial institution.

An "account holding institution (AHI)" refers to a financial institution (e.g., a bank, savings association, credit union, or any other person) that directly or indirectly holds an account belonging to a consumer, or that issues an access device (e.g., bank card or credit card) and agrees with a consumer to provide electronic fund transfer services. In some cases, an AHI may be an issuer. An "issuer" refers to a bank system or other institution that provides payment cards to a cardholder.

A "merchant" refers to a provider of goods or services in exchange for payment. The merchant can be physically present at the sale or remote, such as an online retailer.

The terms "user," "customer," and "consumer" are used interchangeably herein. The term "personal account number" refers to a financial account number, such as, but not limited to, a bank account number, a PAN, and a payment card number. The terms "personal account number" and "account number" are used interchangeably herein. The terms "payment" and "transaction" are used interchangeably herein.

A "Payment Services User (PSU)" refers to a natural or legal person making use of a payment service as a payee, payer or both.

A "Third Party Provider (TPP)" refers to an organization or natural person that uses APIs to access customer's accounts, in order to provide account information services and/or to initiate payments.

A "Payment Initiation Service Provider (PISP)" refers to a third-party provider that provides payment services at the request of a PSU with respect to a payment account held at another payment service provider.

An "Account Servicing Payment Service Provider (ASPSP)" provides and maintains a payment account for a payer. In the context of the Open Banking Ecosystem, ASPSPs are entities that publish Read/Write APIs to permit, with customer consent, payments initiated by third-party providers and/or make their customers' account transaction data available to third-party providers via their API end points.

Figure 1:
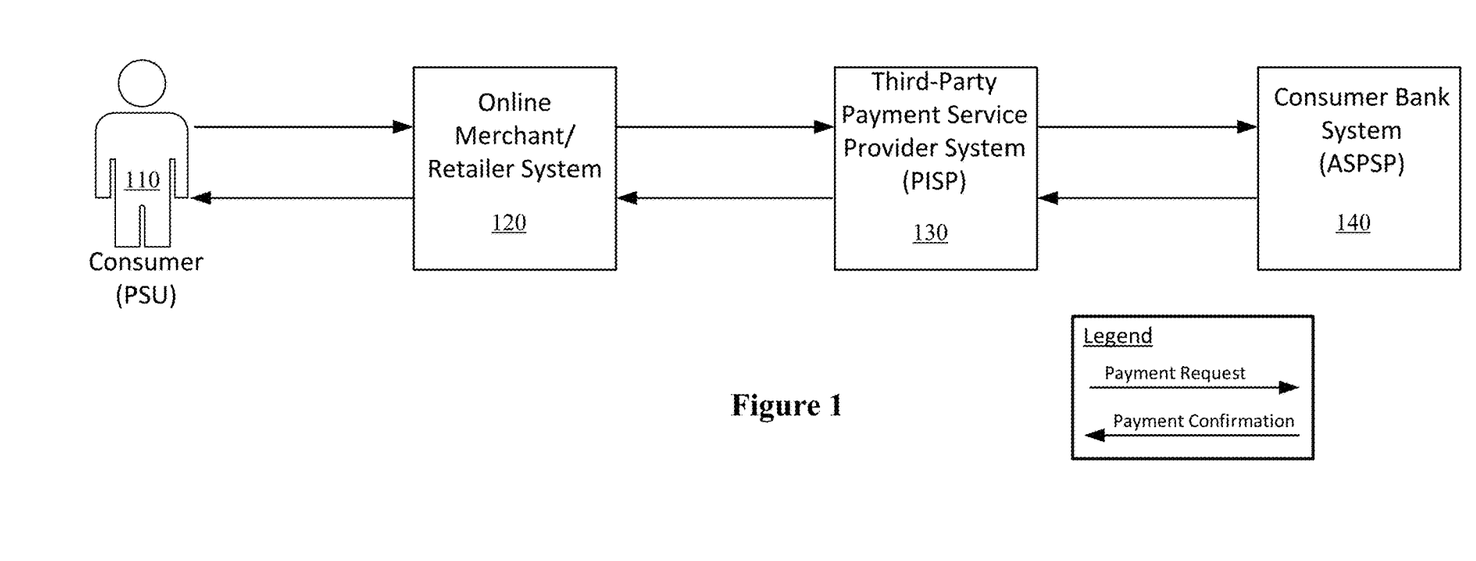
FIG. 1 illustrates an example conventional open banking API and E-commerce integration model.

FIG. 1 illustrates an example conventional open banking API and E-commerce integration model. Referring to FIG. 1, an example conventional open banking API and E-commerce integration model includes a consumer (PSU) 110, and online merchant/retailer system (merchant) 120, a third-party payment service provider system (PISP) 130, and a consumer bank system (ASPSP) 140.

Open banking allows consumers (e.g., PSU 110) to access their payment accounts through third-party payment providers (e.g., PISP 130). Open banking access also allows ASPSPs (e.g., ASPSP 140) to let third-party payment providers request payments and account information from those ASPSPs on behalf of consumers. The third parties must communicate securely with the ASPSP via a secure interface. The secure interface is often considered to be an API and is provided by the ASPSP.

The PSU 110 can register for open banking access with the PISP 130. The PSU 110 can select one or more payment accounts held by the ASPSP 140 to link to the PISP 130. During registration, the PSU 110 must provide explicit consent for the PISP 130 to access the account data and initiate any payments.

Conventionally, open banking supports E-commerce transactions only. During a payment request of an E-commerce transaction, the PSU 110 can place an order on a website for the merchant 120. The merchant 120 can communicate with the PISP 130, which has been authorized by the PSU 110. The merchant 120 must have the required customer credentials and/or security token(s) to initiate a payment through the PISP 130. These credentials can be provided by the PSU 110 and/or the ASPSP 140 during registration.

The PISP 130 can initiate the E-commerce transaction at the ASPSP 140 via an API, such as a secure OAuth connection. When initiating the transaction, the PISP 130 can package the transaction information from the PSU 110 and the merchant 120 and send that transaction information to the ASPSP 140.

Once the ASPSP 140 receives the transaction, the ASPSP 140 can verify the request from the PISP 130. In some cases, the ASPSP 140 performs a 2-factor authentication before executing the payment. For example, if the amount of the transaction is over a certain limit, the ASPSP 140 may perform the 2-factor authentication. Once the request is verified, the ASPSP 140 can debit the account of the PSU 110 and wire the funds to the merchant 120.

Once the payment has been executed, a payment confirmation can be sent. During payment confirmation, the ASPSP 140 can notify the PISP 130 and the merchant 120 of the confirmation.

Communication to and from the components, such as the PISP 130 and ASPSP 140, during the payment request and payment confirmation are carried out via open banking APIs using an open banking API channel. Open banking APIs support consumer account management and fund movement. Examples of open banking APIs used during a payment request include branch and ATM data APIs, product information APIs, and SCA-token management APIs (OAuth). Examples of open banking APIs used during payment confirmation include branch and account and transaction APIs, payment initiation APIs (domestic and international), and fund confirmation APIs.

Figure 2:
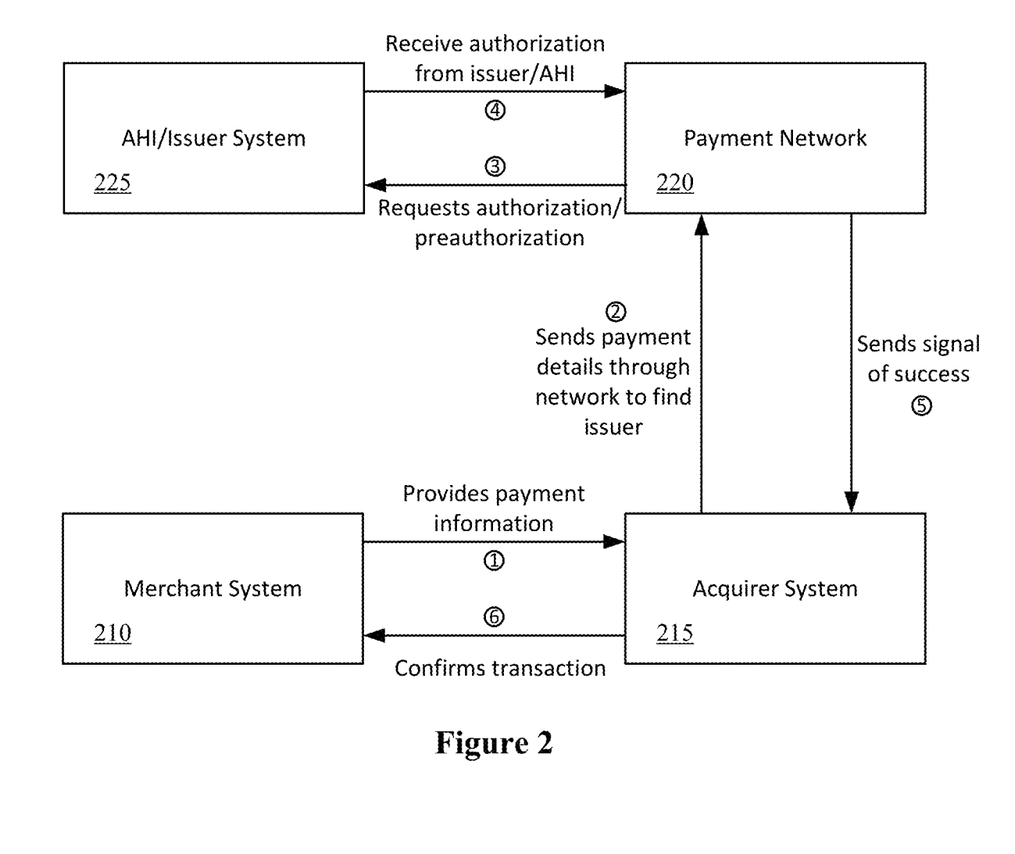
FIG. 2 illustrates an example conventional payment card process.

FIG. 2 illustrates an example conventional payment card process. Referring to FIG. 2, in conventional payment card processes, there can be communication between a merchant system 210, an acquirer system 215, a payment network 220, and an issuer system 225. These communications can include payment card authorization, clearing, and settlement.

A process of payment card authorization can begin with a customer providing a form of payment to purchase goods or services. In the event that the form of payment is a credit card, either a physical card or a contactless card (e.g., hosted on a mobile device, and available on an e-wallet), a point-of-sale (POS) terminal for the merchant system 210 can be used to obtain the information for payment. The POS system can extract information about the form of payment such as the credit card number, confirmation code, and expiration date, and can also record information about the purchase, such as location, amount, goods type, and a form of verification provided. This information can be provided to an acquirer system 215 associated with the merchant system 210 as reflected by flow 1. The acquirer system 215 can, in turn, provide the information to the payment network 220 associated with the form of payment as reflected by flow 2.

The payment network 220 can identify an issuing bank, or issuer system 225, of the customer's form of payment. The transaction can be logged to aid in later processes, such as clearing and settlement. When the payment network 220 identifies the issuer system 225, the payment network 220 can send some of the payment information and request authorization and/or preauthorization on the payment method, as reflected by flow 3.

The issuer system 225 can respond to the requested authorization or preauthorization. Authorization can entail ensuring that a transaction is legitimate, such as by checking the provided verification, location, and amount. For example, a provided form of verification can be compared against previously given verification, including biometrics, to determine if the customer is the legitimate cardholder. Similarly, the issuer system 225 can compare the location of the merchant system 210 against typical spending locations for the cardholder to detect fraudulent charges. as another measure, the issuer system 225 can determine that a purchase is likely to be too high to be legitimate and flag the purchase as possibly fraudulent. The authorization can also check to see if the card is currently locked or suspended. Pre-authorization can entail determining that a customer has sufficient credit to make the transaction. A credit card pre-authorization is a temporary hold on the funds that last for a period of time (e.g., five days). During the temporary hold, the cardholder cannot spend the money anywhere else, but the charge may not actually show up on their credit card statement. After one or more of these checks are performed, the issuer system 225 can accept the transaction and forward a signal of success or failure back to the payment network 220 as reflected by flow 4.

Once the signal is received, the payment network 220 can forward the signal to the acquirer system 215 as reflected by flow 5. The acquirer system 215 can then forward the signal back to the merchant system 210 as reflected by flow 6 to confirm that the transaction has been accepted. Later on, settlement and clearing can occur. In clearing, the payment information can be double checked for accuracy. In settlement, the issuer system 225 can transfer funds to the payment network 220; the payment network 220 can then transfer the funds to the acquirer system 215. Once the acquirer system 215 receives the funds, the funds can be made available to the merchant system 210.

Figure 3:
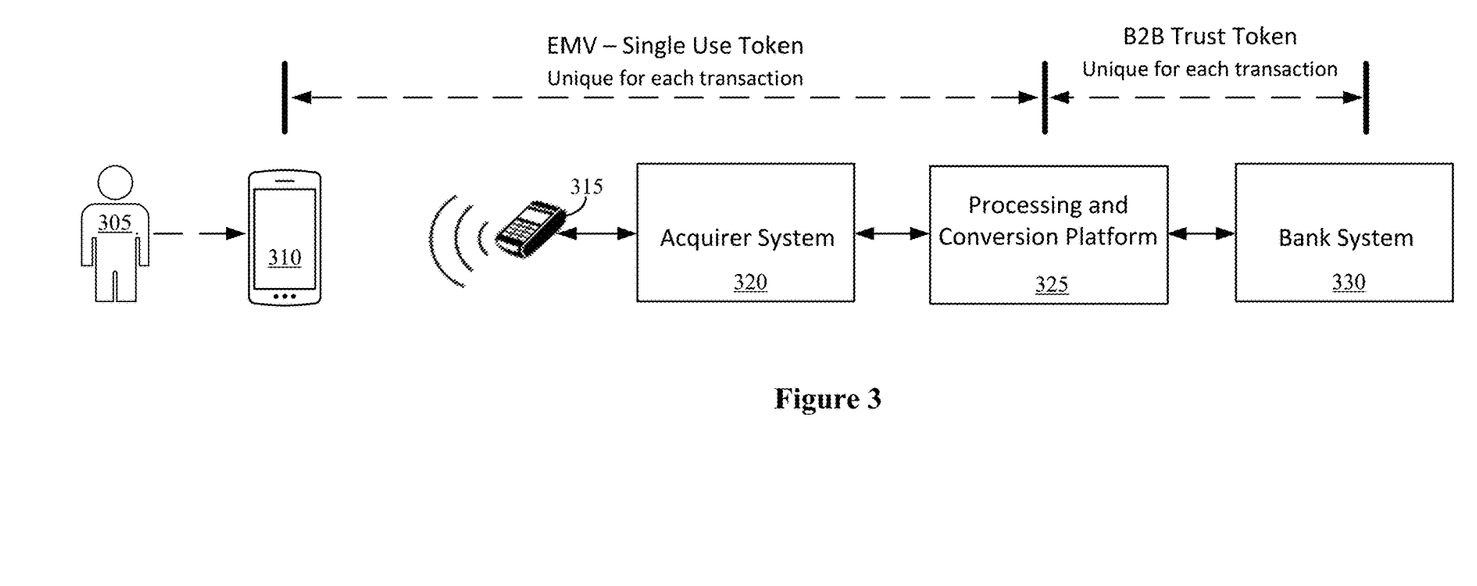
FIG. 3 illustrates an overview of an example bilateral trust model used by a processing and conversion platform according to an embodiment of the invention.

FIG. 3 illustrates an overview of an example bilateral trust model used by a processing and conversion platform according to an embodiment of the invention. Referring to FIG. 3, a bilateral trust model can be established to meet any SCA requirement. The operating environment can include a user 305, a user device 310, a POS terminal 315, an acquirer system 320, a processing and conversion platform 325, and a bank system 330.

In the bilateral trust model, a single use token, such as an EMV token, is utilized from the user device 310 to the processing and conversion platform 325. The single use token is unique for each transaction. Then, a B2B trust token is utilized from the processing and conversion platform 325 to the bank system 330. The B2B trust token is also unique for each transaction.

During a contactless payment transaction with payment card network to open banking conversion, the user 305 can initiate, via the POS terminal 315, a contactless payment request using the user device 310. The POS terminal 315 can package the contactless payment information and provide this information to the acquirer system 320. The contactless payment information can include tokenized account information (e.g., the single use token), transaction information, and merchant information.

The acquirer system 320 can provide the contactless payment information to the processing and conversion platform 325, for example, via a payment network. The processing and conversion platform 325 can receive the contactless payment information via a payment card API channel.

The processing and conversion platform 325 can process and convert the contactless payment information, including the single use token, into an open banking message which includes the B2B trust token. A detailed description of this processing and conversion will be provided later.

The processing and conversion platform 325 can communicate the open banking message to the bank system 330 via an open banking API channel. The open banking message includes the B2B trust token.

Figure 4:
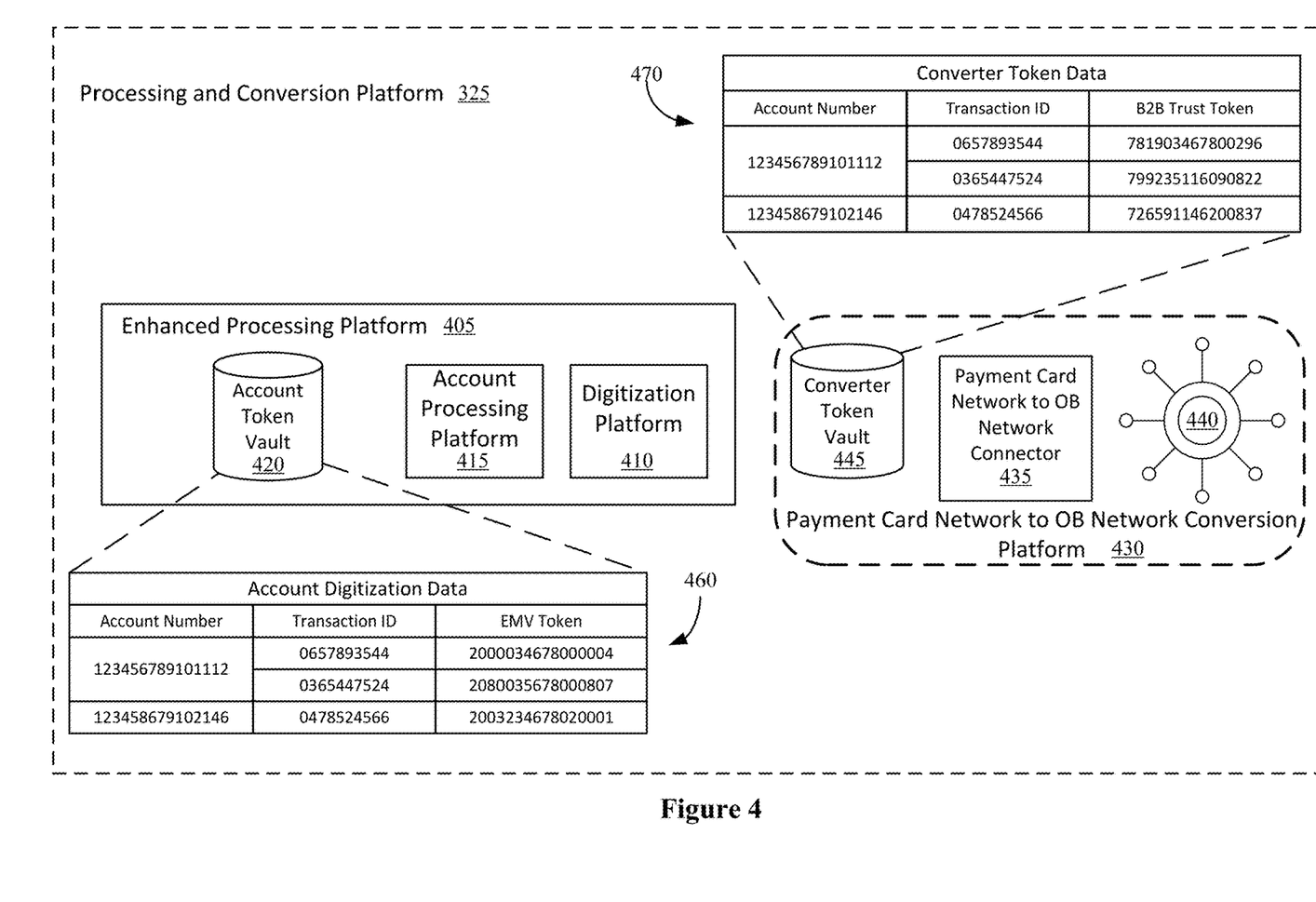
FIG. 4 illustrates an example enhanced processing and conversion platform according to an embodiment of the invention.

FIG. 4 illustrates an example processing and conversion platform according to an embodiment of the invention. The conventional open banking APIs have connectivity between the open banking aggregated platform and the bank. Conventional open banking APIs support consumer account management and fund movement. As previously mentioned, open banking APIs available through the open banking API channel include, for example, APIs to access a consumer account, view the balance of the consumer account, and move funds from one consumer account to another consumer account.

However, the conventional open banking API channel does not hold the semantics to manage the POS contactless transaction lifecycle. That is, the conventional open banking API channel does not support end-to-end settlement and end-to-end transaction management. The APIs that support end-to-end settlement and end-to-end transaction management are typically only available on the payment card API channel. Advantageously, though the described technology, these APIs are made available on the open banking API channel.

The processing and conversion platform includes the functionality and components to provide, through the open banking API channel, the features which are required for end-to-end transaction lifecycle management and end-to-end settlement.

Referring to FIG. 4, an example processing and conversion platform, such as processing and conversion platform 325 as described with respect to FIG. 3, can include an enhanced processing platform 405, a digitization platform 410, an account processing platform 415, an account token vault 420, a payment card network to open banking network conversion platform ("converter") 430, a payment card network to open banking network connector ("connector") 435, an open banking aggregated platform 440, and a converter token vault 445.

The enhanced processing platform 405, includes or communicates with the digitization platform 410, the account processing platform 415, and the account token vault 420.

The digitization platform 410 is responsible for digitization and tokenization of forms of payment. The account processing platform 415 supports the management of consumer accounts. The account processing platform 415 can use the digitization platform 410 to digitize consumer bank accounts and provide a wide range of payment options, such as ecommerce, contactless, and QR payments.

The account processing platform 415 can leverage the converter 430 to interface with the various financial institutions via an open banking API channel. The converter 430, includes or communicates with the connector 435, the open banking aggregated platform 440, and the converter token vault 445.

The connector 435 can provide adaptor functionality to push contactless payment instructions to the issuer or bank via the open banking API channel. The connector 435 can maintain a mapping of each token issued as a B2B trust token against a particular transaction.

The open banking aggregated platform 440 has connectivity with various financial institution's open banking API channels and can provide a single connection to financial institutions' open banking functionality.

A token vault refers to a repository where issued digitized payment tokens and corresponding personal account numbers are securely stored. In the example of FIG. 4, the account token vault 420 includes one or more data sets, including account digitization data 460. Account digitization data 460 contains mappings of EMV tokens to both bank account numbers and transactions. The converter token vault 445 includes one or more data sets, including converter token data 470. Converter token data 470 contains mappings of B2B trust tokens to both bank account numbers and transactions. The account token vault 420 and converter token vault 445 may be the same storage resource and, in some cases, provide all four mappings in a single data structure.

As an illustrative example, when a consumer requests an account based contactless payment transaction, the enhanced processing platform 405 can receive a request to issue a single use token for the transaction. In the illustrative example of FIG. 4, the consumer's account number is 123456789101112 and the transaction has a transaction ID of 0657893544.

In this case, the digitization platform 410 can issue a single use token for the transaction corresponding to the consumer account number. In this case, the single use token issued for transaction ID 0657893544 is 2000034678000004. The digitization platform 410 can pass that information to the account processing platform 415, which can store the consumer account information, the transaction ID, and the single use token in the account token vault 420. The single use token can be provisioned on the consumer's user device and made available to the consumer to use for the contactless payment transaction.

When the contactless payment is initiated, the enhanced processing platform 405 can receive, from a payment network via a payment card API channel, contactless payment information. As previously described, the contactless payment information can include tokenized account information (e.g., 2000034678000004), transaction information (e.g., transaction ID 0657893544), and merchant information.

The enhanced processing platform 405 can process the contactless payment information to generate a contactless payment message. During the processing, the enhanced processing platform 405 can perform token verification under EMV Co and detokenize the single use token to identify the consumer's account number.

In the illustrative example of FIG. 4, the enhanced processing platform 405 can de-tokenize the single use token 2000034678000004 to identify the consumer's account number of 123456789101112.

The enhanced processing platform 405 can communicate, via the payment card API channel (or an API or internal communication within the processing and conversion platform itself), the contactless payment message to the converter 430. The contactless payment message can include at least a consumer account number (e.g., 123456789101112), an acquirer account number, and the transaction information (e.g., transaction ID 0657893544).

Using the connector 435, the converter 430 can convert the contactless payment message to an open banking message. During conversion, a B2B trust token corresponding to the consumer account number can be obtained. Here, the B2B trust token issued for transaction ID 0657893544 is 781903467800296. A mapping of the issued B2B trust token and the corresponding transaction ID and account number is stored in the converter token vault 445. The converter token vault 445 can provide transaction history for each transaction. The open banking message can be created using at least the B2B trust token (e.g., 781903467800296), the acquirer account number, and the transaction information (e.g., transaction ID 0657893544).

Through the open banking aggregated platform 440, the converter 430 can send the open banking message to a bank system (e.g., a consumer bank system), via an open banking API channel.

The described technology can also support refunds and reversals. As an illustrative example, the consumer can initiate a return of the account based contactless payment transaction (e.g., the transaction discussed above and having transaction ID 0657893544) by requesting a refund from the merchant. The processing and conversion platform 325 can convert the request to an open banking payment initiation API for refund and reversal with real time money movement to consumer's account. Then, offline clearing settlement process can settle the money from the acquirer account to the issuer's account.

In some cases, the converter 430 includes a dispute portal to initiate a dispute. Advantageously, instead of requiring each bank system to build their own dispute management, the converter 430 can provide a centralized dispute portal which can be accessible across each bank system's back office users.

Figure 5:
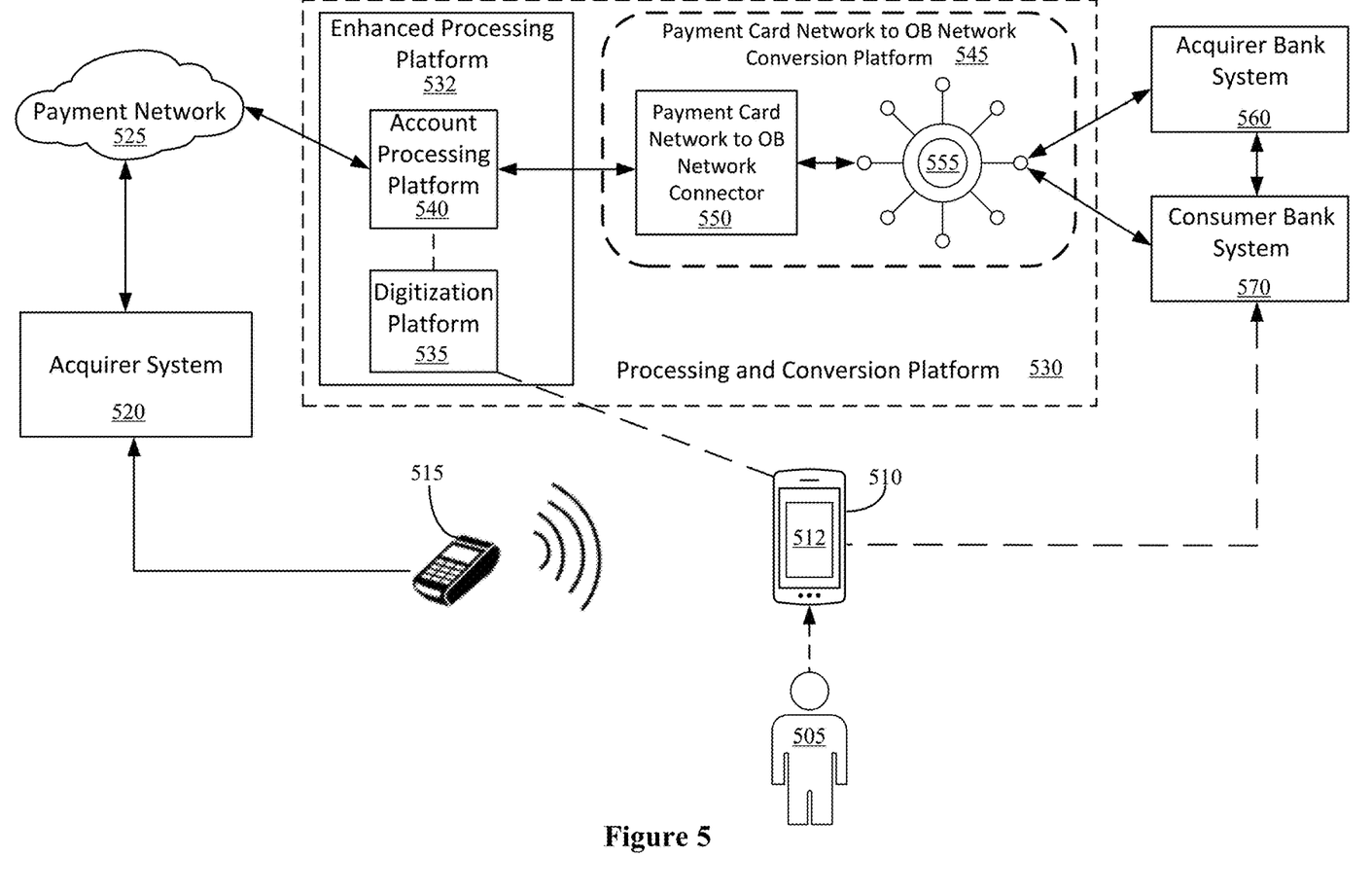
FIG. 5 illustrates an example operating environment for contactless payments with payment card network to open banking network conversion.

FIG. 5 illustrates an example operating environment for contactless payments with payment card network to open banking network conversion. Referring to FIG. 5, an example operating environment can include a consumer 505, a user device 510, a banking application 512, a POS terminal 515, an acquirer system 520, a payment network 525, a processing and conversion platform 530, an enhanced processing platform 532, a digitization platform 535, an account processing platform 540, a payment card network to open banking network conversion platform ("converter") 545, a payment card network to open banking network connector ("connector") 550, an open banking aggregated platform 555, an acquirer bank system 560, and a consumer bank system 570.

The enhanced processing platform 532, includes or communicates with the digitization platform 535 and the account processing platform 540.

The digitization platform 535 is responsible for digitization and tokenization of various forms of payment. The account processing platform 540 supports the management of consumer accounts. The account processing platform 540 can use the digitization platform 535 to digitize consumer bank accounts and provide a wide range of payment options, such as ecommerce, contactless, and QR payments.

The account processing platform 540 can leverage the converter 545 to interface with the various financial institutions. The converter 545, includes or communicates with the connector 550 and the open banking aggregated platform 555.

The connector 550 can provide adaptor functionality to push contactless payment instructions to the issuer or bank. The connector 550 can maintain a mapping of each token issued as a B2B trust token against a particular transaction.

The open banking aggregated platform 555 has connectivity with various financial institution's open banking API channels and can provide a single connection to financial institutions' open banking functionality.

A user device (e.g., user device 510) may be, but is not limited to, a personal computer, a laptop computer, a desktop computer, a tablet computer, a reader, a mobile device, a personal digital assistant, a smart phone, a gaming device or console, a wearable computer, a wearable computer with an optical head-mounted display, computer watch, a whiteboard, or a smart television.

The payment network 525 routes payment information to the appropriate issuer. The payment network 525 may be a real time payment network.

Components (computing systems, storage resources, and the like) in the operating environment may operate on or in communication with each other over a communication network (not shown). The communication network can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The communication network may include one or more connected networks (e.g., a multi-network environment) including public networks, such as the Internet, and/or private networks such as a secure enterprise private network. Access to the communication network may be provided via one or more wired or wireless access networks as understood by those skilled in the art.

As previously mentioned, communication to and from the components, such as the bank systems and the processing and conversion platform are carried out via APIs. An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

During a contactless payment transaction with payment card network to open banking network conversion, the consumer 505 can select an account from which to make a contactless payment using the virtual wallet/banking application 512 on the user device 510.

The digitization platform 535 can issue a single use token for the transaction corresponding to the selected account number. The digitization platform 535 can pass the single use token and account information to the account processing platform 540, which can store the consumer account information, the transaction ID, and the single use token in a token vault, such as account token vault 420 described with respect to FIG. 4. The single use token can be provisioned on the user device 510 and made available to the consumer 505 to use for the contactless payment transaction.

The consumer 505 can use the user device 510 to initiate the contactless payment via the POS terminal 515. The POS terminal 515 can package information about the contactless payment and provide this information to the acquirer system 520. The contactless payment information can include tokenized account information (e.g., the single use token), transaction information, and merchant information.

The acquirer system 520 can provide the contactless payment information to the processing and conversion platform 530, via the payment network 525. The payment network 525 can send the contactless payment information along with a pre-authorization request and/or an authorization request to the processing and conversion platform 530. The processing and conversion platform 530 can receive the contactless payment information and pre-authorization/authorization request via a payment card API channel.

The processing and conversion platform 530 can process and convert the contactless payment information, including the single use token, into an open banking message which includes the B2B trust token.

When processing and converting the contactless payment information, the enhanced processing platform 532 of the processing and conversion platform 530 can process the contactless payment information to generate a contactless payment message. During the processing, the enhanced processing platform 532 can perform token verification under EMV Co and detokenize the single use token to identify the account number of the consumer 505 (i.e., consumer account number). The contactless payment message can include at least the consumer account number, an acquirer account number, and the transaction information.

In some cases, for example where the payment network provided an authorization request, the contactless payment message may be a contactless payment authorization message. In some cases, for example where the payment network provided a pre-authorization request, the contactless payment message may be a contactless payment pre-authorization message.

The enhanced processing platform 532 can communicate, via the payment card API channel (or an API or internal communication within the processing and conversion platform itself), the contactless payment message to the converter 545. The converter 545 can convert the contactless payment message to an open banking message, which includes a B2B trust token.

In the case where the contactless payment message is a contactless payment pre-authorization message, the contactless payment pre-authorization message is converted to an open banking fund confirmation message. An open banking fund confirmation message is a request to confirm that there are enough funds in the consumer's bank account to complete the transaction.

In the case where the contactless payment message is a contactless payment authorization message, the contactless payment authorization message is converted to an open banking payment initiation message. The open banking payment initiation message can initiate the movement of funds from the consumer account corresponding to the consumer account number to an acquirer account corresponding to the acquirer account number.

A more detailed discussion of the conversion of the contactless payment authorization message to the open banking authorization message will be described in FIG. 6B.

The processing and conversion platform 530 can communicate the open banking message to the consumer bank system 570 via an open banking API channel. Once the consumer bank system receives the open banking message, the consumer bank system 570 can communicate with the acquirer bank system 560 to move the funds from the consumer account to the acquirer account.

Advantageously, the consumer bank system 570 does not need to build API specification support for POS contactless transactions. Instead, the consumer bank system 570 can allow fund movement API access to the processing and conversion platform 530.

Figure 6A:
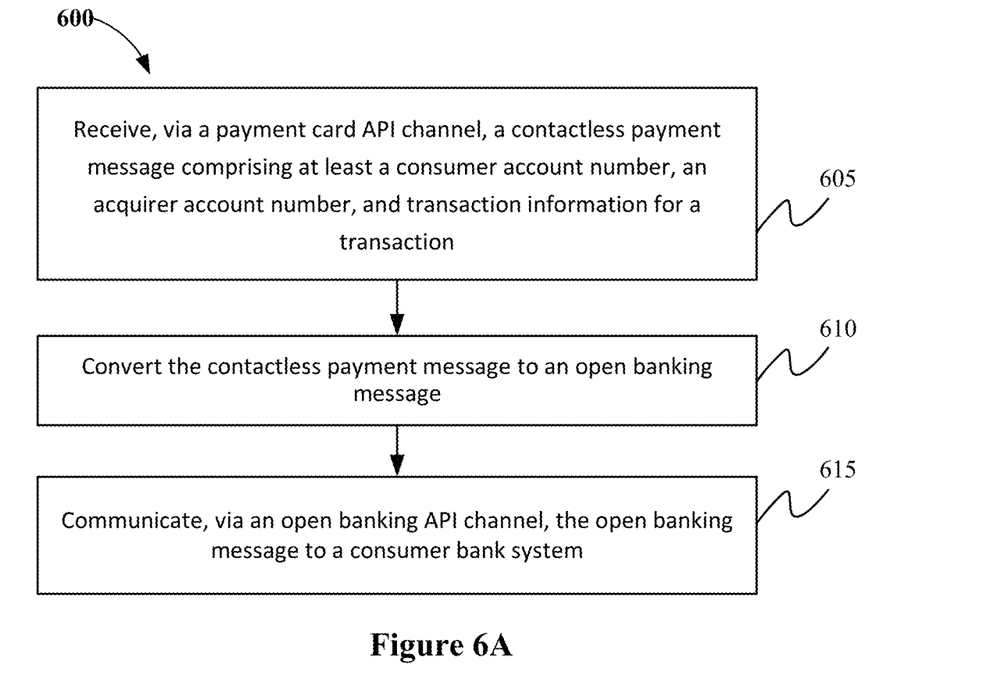
FIG. 6A illustrates an example process carried out by an enhanced processing and conversion platform according to an embodiment of the invention.
Figure 6B:
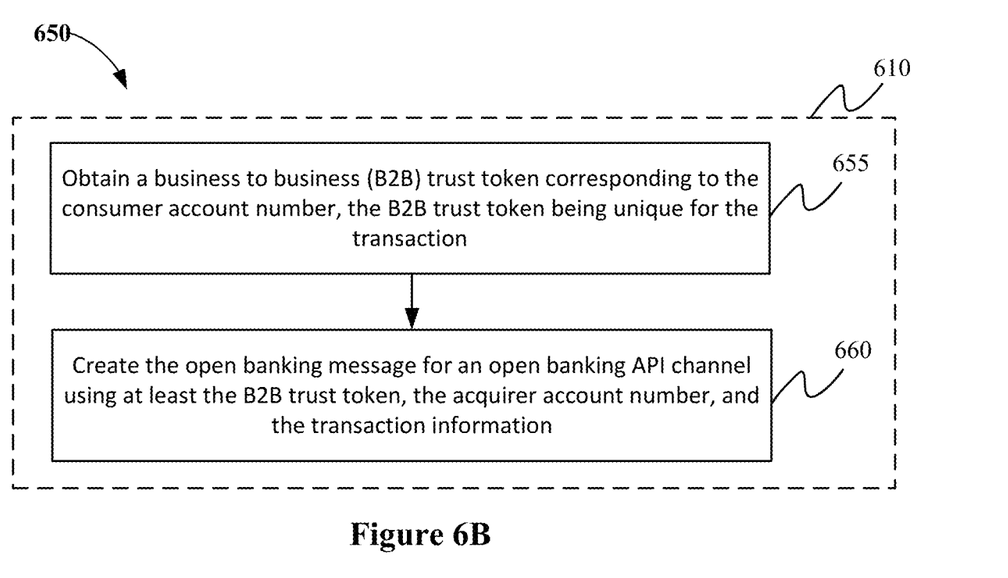
FIG. 6B illustrates an example process of converting a contactless payment message to an open banking message according to an embodiment of the invention.

FIG. 6A illustrates an example process carried out by a payment card network to open banking network conversion platform according to an embodiment of the invention; and FIG. 6B illustrates an example process of converting a contactless payment message to an open banking message according to an embodiment of the invention. Referring to FIG. 6A and FIG. 6B, a payment card network to open banking network conversion platform ("converter"), performing processes 600 and 650, can be implemented by a system embodied as described with respect to system 760 as shown in FIG. 7C. The converter includes or communicates with a payment card network to open banking connector ("connector"), an open banking aggregated platform, and a converter token vault. Processes 600 and 650 may be implemented in the example operating environment shown in FIG. 5.

Referring to process 600 of FIG. 6A, the converter can receive (605) a contactless payment message comprising at least a consumer account number, an acquirer account number, and transaction information for a transaction. The contactless payment message can be received at the connector via a payment card API channel (e.g., directly or indirectly via a separate enhanced processing platform). The connector can convert (610) the contactless payment message to an open banking message.

Referring to FIG. 6B, process 650 describes an example process of converting a contactless payment message to an open banking message (i.e., step 610 of FIG. 6A) in more detail.

The connector can obtain (655) a business-to-business (B2B) trust token corresponding to the consumer account number received in the contactless payment message. In some cases, the B2B trust token can be generated and stored in the converter token vault. In some cases, the B2B trust token may have already been issued and stored in the converter token vault. In this case, the B2B trust token can be identified from the converter token vault.

A mapping of the issued B2B trust token and the corresponding transaction ID and account number is stored in the converter token vault and the B2B trust token is unique for each transaction.

The connector can create (660) the open banking message for the open banking API channel using at least the B2B trust token, the acquirer account number, and the transaction information.

In some cases, the contactless payment message is a contactless payment pre-authorization message. A contactless payment pre-authorization message is request for pre-authorization ("pre-auth") processing. A pre-auth is a temporary hold on the funds that last for a period of time (e.g., 5 days). The amount placed on hold is removed from the account holder's available bank balance and the account holder can typically see that the funds are on hold. Holds are typically released when the transaction clears the account holder's account or a period of time from the original transaction time.

In this case, the contactless payment pre-authorization message is converted to an open banking fund confirmation message. An open banking fund confirmation message is a request to confirm that there are enough funds in the consumer's bank account to complete the transaction. That is, the open banking confirmation message is a request for confirmation of funds in the consumer account corresponding to the consumer account number.

The open banking fund confirmation message allows a pre-auth request, which is typically available on the payment card API network, to be made available on the open banking channel by leveraging the open banking fund confirmation API.

In some cases, the contactless payment message is a contactless payment authorization message. A contactless payment authorization message authorizes the consumer's bank to transfer the funds from the consumer account associated with the consumer account number to the acquirer's account associated with the acquirer account number.

In this case, the contactless payment authorization message is converted to an open banking payment initiation message. The open banking payment initiation message can initiate the movement of funds from the consumer account corresponding to the consumer account number to an acquirer account corresponding to the acquirer account number.

The open banking payment initiation message allows an authorization request, which is typically available on the payment card API network, to be made available on the open banking channel by leveraging the open banking payment initiation API.

In some cases, the contactless payment message is a contactless payment verification and digitization message. A contactless payment verification and digitization message initiates a verification and digitization request for a consumer's bank account.

In this case, the contactless payment verification and digitization message is converted to an open banking account and transaction message. The open banking account and transaction message can initiate action on a consumer's account. For example, the open banking account and transaction message can initiate a verification of the consumer account. In another example, the open banking account and transaction message can initiate a digitization of the consumer account.

The open banking account and transaction message allows a verification and digitization request, which is typically available on the payment card API network, to be made available on the open banking channel by leveraging the open banking account and transaction API.

In some cases, the contactless payment message is a contactless payment refund message. A contactless payment refund message initiates a refund of funds to the consumer bank account.

In this case, the contactless payment refund message is converted to an open banking payment initiation message. The open banking payment initiation message can initiate a refund of funds to the consumer account corresponding to the consumer account number.

The open banking payment initiation message allows a refund request, which is typically available on the payment card API network, to be made available on the open banking channel by leveraging the open banking payment initiation API.

In some cases, the contactless payment message is a contactless payment reversal message. A contactless payment reversal message initiates a transfer of funds to the consumer bank account.

In this case, the contactless payment reversal message is converted to an open banking payment initiation message. The open banking payment initiation message can initiate a transfer of funds to the consumer account corresponding to the consumer account number.

The open banking payment initiation message allows a reversal request, which is typically available on the payment card API network, to be made available on the open banking channel by leveraging the open banking payment initiation API.

Returning to process 600 of FIG. 6A, the converter can communicate (615) the open banking authorization message to a consumer bank system using an open banking aggregated platform. The open banking authorization message can be communicated via an open banking API channel.

Figure 7A:
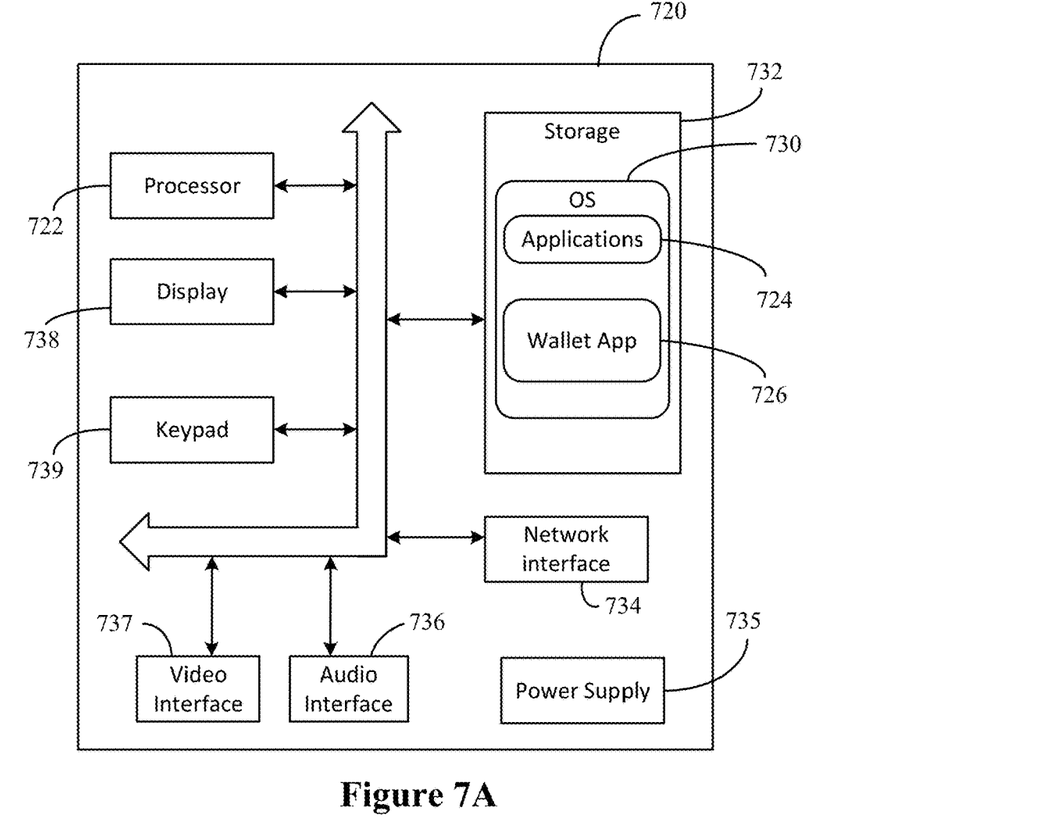
FIG. 7A illustrates components of an example computing device that may be used for contactless payments.

FIG. 7A illustrates components of an example computing device that may be used for contactless payments. Referring to FIG. 7A, computing device 720 can represent, for example, a mobile phone, tablet, smart watch, or other mobile computing device. Computing device 720 can be considered a payment device when used to perform contactless payment processes.

Computing device 720 includes a processor 722 that executes instructions of one or more application programs 724, wallet application 726, and/or operating system 730 that are stored in storage 732. The processor 722 may be, or is included in, a system-on-chip (SoC) along with one or more other components such as sensors (e.g., magnetometer, an ambient light sensor, a proximity sensor, an accelerometer, a gyroscope, a Global Positioning System sensor, temperature sensor, shock sensor) and network connectivity components (e.g., including Radio/network interface 734).

The one or more application programs 724, including wallet application 726, may be stored in storage be loaded into storage 732 and run on or in association with the operating system 730. Examples of application programs include phone dialer programs, e-mail programs, Internet browser programs, messaging programs, game programs, and the like.

In various implementations, data/information stored via the computing device 720 may include data caches stored locally on the device (e.g., in storage 732 or another local storage resource) or the data may be stored on any number of storage media that may be accessed by the device via the network interface 734.

Computing device 720 has a power supply 735, which may be implemented as one or more batteries and/or an energy harvester (ambient-radiation, photovoltaic, piezoelectric, thermoelectric, electrostatic, and the like). Power supply 735 may further include an external power source, such as an AC adapter or a powered docking cradle that supplements or recharges the batteries.

Computing device 720 may also include a network interface 734 that performs the function of transmitting and receiving communications such as radio frequency communications. The network interface 734 facilitates wireless connectivity between computing device 720 and the "outside world," via a communications carrier or service provider. Transmissions to and from the network interface 734 are conducted under control of the operating system 730, which disseminates communications received by the network interface 734 to the one or more application programs 724 and vice versa. In some cases, near field communication (NFC) or other communication interface devices (not shown) can be included. NFC can be used by computing device 720 for communicating payment and transaction information from the wallet application 726 to a contactless payment supported terminal.

An audio interface 736 can be used to provide audible signals to and receive audible signals from the user. For example, the audio interface 736 can be coupled to speaker to provide audible output and a microphone to receive audible input, such as to facilitate a telephone conversation. A speaker may also be incorporated so that a user may interact with the computing device via voice commands.

Computing device 720 may further include video interface 737 that enables an operation of an optional camera (not shown) to record still images, video stream, and the like. A camera may also be used to capture gestures used for interacting with the computing device.

Visual output can be provided via a display 738. In some cases, the display 738 may be a touch screen display. A keypad 739 can also be included for user input. The keypad 739 may be a physical keypad or a soft keypad generated on display 738.

It should be understood that any computing device implementing computing device 720 may have more or fewer features or functionality than described and is not limited to the configurations described herein.

Figure 7B:
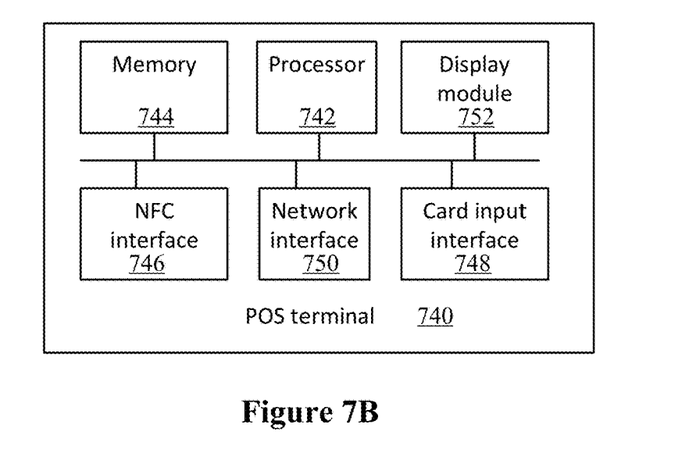
FIG. 7B illustrates components of an example terminal.
Figure 7C:
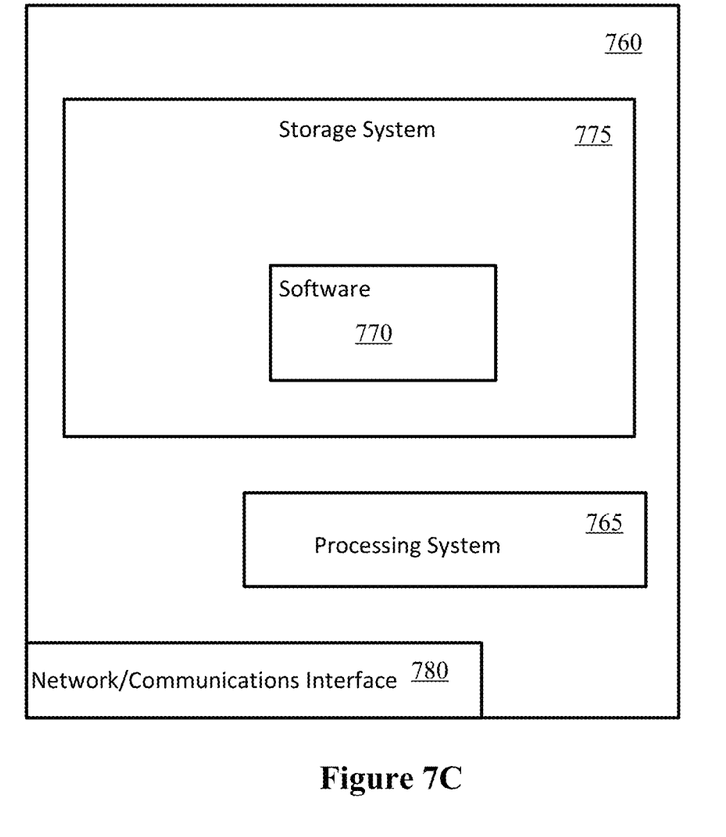
FIG. 7C illustrates components of a computing system that may be used in certain embodiments described herein.

FIG. 7B illustrates components of an example terminal. Referring to FIG. 7B, a POS terminal 740 can include a processor 742, memory 744, a payment interface embodied as an NFC interface 746 and/or card input interface 748, a network interface 750, and display module 752. The POS terminal 740 may have more or fewer components depending on implementation. The memory 744 can store instructions that, when executed by processor 742, direct the POS terminal to perform various processes. The NFC interface 746 supports contactless payment communications with a device and the card input interface 748 supports insertion of a payment card for contact-based payment communications with a device. The POS terminal 740 can communicate with other devices and systems, including a protection server, via the network interface 750. Information (including whether a transaction was approved or declined) can be output for viewing on the display module 752.

FIG. 7C illustrates components of a computing system that may be used in certain embodiments described herein. Referring to FIG. 7C, system 760 may be implemented within a single computing device or distributed across multiple computing devices or sub-systems that cooperate in executing program instructions. The system 760 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 760 can include a processing system 765, which may include one or more processors and/or other circuitry that retrieves and executes software 770 from storage system 775. Processing system 765 may be implemented within a single processing device but may also be distributed across multiple processing devices or sub-systems that cooperate in executing program instructions.

Storage system(s) 775 can include any computer readable storage media readable by processing system 765 and capable of storing software 770. Storage system 775 may be implemented as a single storage device but may also be implemented across multiple storage devices or sub-systems co-located or distributed relative to each other. Storage system 775 may include additional elements, such as a controller, capable of communicating with processing system 765. Storage system 775 may also include storage devices and/or sub-systems on which data is stored. System 760 may access one or more storage resources in order to access information to carry out any of the processes indicated by software 770.

Software 770, including routines for performing processes, such as processes 600 and 650 for a payment card network to open banking network conversion platform, may be implemented in program instructions and among other functions may, when executed by system 760 in general or processing system 765 in particular, direct the system 760 or processing system 765 to operate as described herein. In some cases, functionality of account processing platform 415, digitization platform 410, and connector 435 of FIG. 4 can all be implemented in whole or in part in software 770.

In embodiments where the system 760 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A communication interface 780 may be included, providing communication connections and devices that allow for communication between system 760 and other computing systems (not shown) over a communication network or collection of networks (not shown) or the air.

In some embodiments, system 760 may host one or more virtual machines.

Alternatively, or in addition, the functionality, methods, and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

It should be understood that as used herein, in no case do the terms "storage media," "computer-readable storage media" or "computer-readable storage medium" consist of transitory carrier waves or propagating signals. Instead, "storage" media refers to non-transitory media.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A method comprising:
receiving, via a payment card application programming interface (API) channel, a contactless payment message comprising at least a consumer account number, an acquirer account number, and transaction information for a transaction;
converting the contactless payment message received via the payment card API channel to an open banking message for an open banking API channel by:
obtaining a business-to-business (B2B) trust token corresponding to the consumer account number, the B2B trust token being unique for the transaction; and
creating the open banking message for the open banking API channel using at least the B2B trust token, the acquirer account number, and the transaction information; and
communicating, via the open banking API channel, the open banking message including the B2B trust token to a consumer bank system.

2. The method of claim 1, wherein obtaining the B2B trust token comprises generating the B2B trust token using at least the consumer account number and the transaction information.

3. The method of claim 1, wherein the contactless payment message is a contactless payment pre-authorization message and the open banking message is an open banking fund confirmation message, the open banking fund confirmation message being a request for confirmation of funds in a consumer account corresponding to the consumer account number.

4. The method of claim 1, wherein the contactless payment message is a contactless payment authorization message and the open banking message is an open banking payment initiation message, wherein the open banking payment initiation message initiates a movement of funds from a consumer account corresponding to the consumer account number to an acquirer account corresponding to the acquirer account number.

5. The method of claim 1, wherein the contactless payment message is a contactless payment verification and digitization message and the open banking message is an open banking account and transaction message, wherein the open banking account and transaction message initiates an action on a consumer account corresponding to the consumer account number.

6. The method of claim 1, wherein the contactless payment message is a contactless payment refund message and the open banking message is an open banking payment initiation message, wherein the open banking payment initiation message initiates a refund of funds to a consumer account corresponding to the consumer account number.

7. The method of claim 1, wherein the contactless payment message is a contactless payment reversal message and the open banking message is an open banking payment initiation message, wherein the open banking payment initiation message initiates a transfer of funds to a consumer account corresponding to the consumer account number.

8. A system comprising:
a processing system;
a storage system;
a data resource associated with the storage system;
a data set stored on the data resource, the data set providing at least a mapping of account numbers, transaction identifiers, and business-to-business (B2B) trust tokens, wherein the B2B trust tokens are unique for each transaction having a transaction identifier; and
instructions stored on the storage system that, when executed by the processing system, direct the processing system to at least:
receive, via a payment card application programming interface (API) channel, a contactless payment message comprising at least a consumer account number, an acquirer account number, and transaction information for a transaction;
converting the contactless payment message received via the payment card API channel to an open banking message for an open banking API channel by:
obtaining a B2B trust token corresponding to the consumer account number, the B2B trust token being unique for the transaction; and
creating the open banking message for the open banking API channel using at least the B2B trust token, the acquirer account number, and the transaction information; and
communicate, via the open banking API channel, the open banking message including the B2B trust token to a consumer bank system.

9. The system of claim 8, wherein the contactless payment message is a contactless payment pre-authorization message and the open banking message is an open banking fund confirmation message, the open banking fund confirmation message being a request for confirmation of funds in a consumer account corresponding to the consumer account number.

10. The system of claim 8, wherein the contactless payment message is a contactless payment authorization message and the open banking message is an open banking payment initiation message, wherein the open banking payment initiation message initiates a movement of funds from a consumer account corresponding to the consumer account number to an acquirer account corresponding to the acquirer account number.

11. The system of claim 8, wherein the contactless payment message is a contactless payment verification and digitization message and the open banking message is an open banking account and transaction message, wherein the open banking account and transaction message initiates an action on a consumer account corresponding to the consumer account number.

12. The system of claim 8, wherein the contactless payment message is a contactless payment refund message and the open banking message is an open banking payment initiation message, wherein the open banking payment initiation message initiates a refund of funds to a consumer account corresponding to the consumer account number.

13. The system of claim 8, wherein the contactless payment message is a contactless payment reversal message and the open banking message is an open banking payment initiation message, wherein the open banking payment initiation message initiates a transfer of funds to a consumer account corresponding to the consumer account number.

14. One or more computer-readable storage media having instructions stored thereon that when executed by a processing system, direct the processing system to:
receive, via a payment card application programming interface (API) channel, a contactless payment message comprising at least a consumer account number, an acquirer account number, and transaction information for a transaction;
converting the contactless payment message received via the payment card API channel to an open banking message for an open banking API channel by:

obtaining a B2B trust token corresponding to the consumer account number, the B2B trust token being unique for the transaction; and creating the open banking message for the open banking API channel using at least the B2B trust token, the acquirer account number, and the transaction information; and communicate, via the open banking API channel, the open banking message including the B2B trust token to a consumer bank system.

15. The media of claim 14, wherein the contactless payment message is a contactless payment pre-authorization message and the open banking message is an open banking fund confirmation message, the open banking fund confirmation message being a request for confirmation of funds in a consumer account corresponding to the consumer account number.

16. The media of claim 14, wherein the contactless payment message is a contactless payment authorization message and the open banking message is an open banking payment initiation message, wherein the open banking payment initiation message initiates a movement of funds from a consumer account corresponding to the consumer account number to an acquirer account corresponding to the acquirer account number.

17. The media of claim 14, wherein the contactless payment message is a contactless payment verification and digitization message and the open banking message is an open banking account and transaction message, wherein the open banking account and transaction message initiates an action on a consumer account corresponding to the consumer account number.

18. The media of claim 14, wherein the contactless payment message is a contactless payment refund message and the open banking message is an open banking payment initiation message, wherein the open banking payment initiation message initiates a refund of funds to a consumer account corresponding to the consumer account number.

19. The media of claim 14, wherein the contactless payment message is a contactless payment reversal message and the open banking message is an open banking payment initiation message, wherein the open banking payment initiation message initiates a transfer of funds to a consumer account corresponding to the consumer account number.

20. The media of claim 14, wherein the instructions to obtain the B2B trust token further direct the processing system to generate the B2B trust token using at least the consumer account number and the transaction information.

* * * * *